Feb. 28, 1950     R. STRUB     2,499,232

GAS TURBINE PLANT

Filed Oct. 7, 1944

INVENTOR
René Strub,
BY
ATTORNEYS

Patented Feb. 28, 1950

2,499,232

UNITED STATES PATENT OFFICE 2,499,232

GAS TURBINE PLANT

René Strub, La Chaux-de-Fonds, Switzerland

Application October 7, 1944, Serial No. 557,617
In Switzerland December 31, 1943

6 Claims. (Cl. 60—49)

The invention relates to a gas turbine plant with a regulating device adjusting the fuel quantity. The invention is characterised in that the regulating device is equipped with a limiting arrangement influenced in accordance with the output of the whole plant, which arrangement sets the range of adjustment of the regulating device in accordance with the varying output. The limiting arrangement can be adjusted for instance by the pressure in the combustion chamber of the gas heater. It is expedient for the regulating device to have a further correcting device with the aid of which the relationship between the output and the regulating range can be changed. The correcting device can for instance be influenced automatically in dependence on the temperature of the air employed for combustion.

Figure 1:
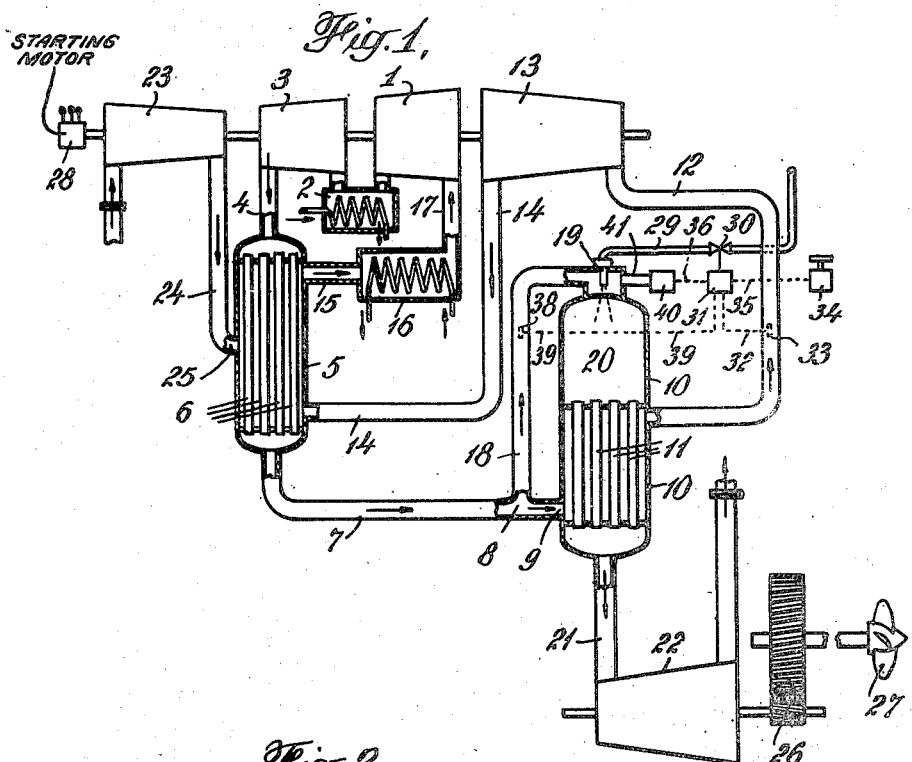
Figure 2:
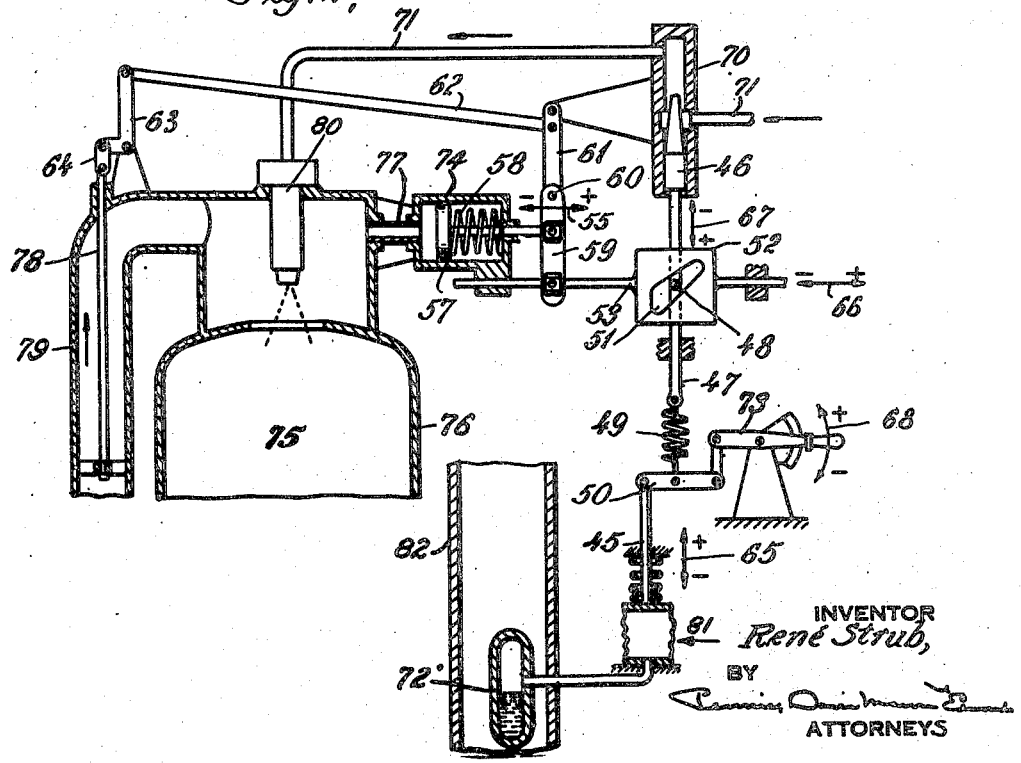

The invention is explained in detail below with the aid of the accompanying drawing, in which:

Fig. 1 illustrates diagrammatically a complete gas turbine plant embodying the invention; and Fig. 2 illustrates one form of a regulating device according to the invention applied to the combustion chamber of the plant illustrated in Fig. 1.

The gas turbine plant shown in Fig. 1 works with a circuit of a gaseous working medium, for instance air, from which a partial quantity is continuously extracted, while a make-up quantity is continuously supplied in its place. A plant of this type may be denominated a "semi-circuit" plant to distinguish it from closed circuit plants in which no portion of the working medium driving any of the turbines is exhausted to the atmosphere and plants of the open circuit type in which no portion of the working medium driving any of the turbines is recirculated. The working medium compressed by the low-pressure compressor 1 passes through the intermediate cooler 2 into the high-pressure compressor 3. After having been brought up to the highest pressure, the working medium flows through the pipe 4 into the heat-exchanger 5, where it is preheated while flowing through the tubes 6. Through the pipe 7 the working medium flows further until it is divided into two parts at the point 8. The major part passes through the pipe 9 into the gas-heater 10, and while flowing over the heat-exchanger tubes 11 is brought up to the highest temperature and then supplied through the pipe 12 to the turbine 13.

The working medium expanded in the turbine 13 passes through the pipe 14 into the heat-exchanger 5 and while flowing over the heat-exchanger tubes 6 gives up a part of its residual heat to the working medium flowing through the tubes. Through the pipe 15 the partly cooled working medium passes into the cooler 16, in which a further part of its residual heat is given up to a cooling-medium. Through the pipe 17 the working medium is finally supplied once more to the low-pressure compressor 1, where the circuit begins anew.

From the circuit of the working medium described a partial quantity is continuously extracted at the point 8 and supplied through the pipe 18 to the burner 19 of the gas-heater 10 as combustion air. The combustion gases flow out of the combustion chamber 20 into the heat-exchanger tubes 11, through the walls of which a portion of its heat is given up to the working medium of the circuit flowing over the tubes. Afterwards the combustion gases pass through the pipe 21 into the turbine 22.

To make up for the quantity of working medium extracted from the circuit at the point 8, air from the atmosphere is continuously supplied to the circuit by the compressor 23. This make-up quantity is introduced into the heat-exchanger 5 through the pipe 24 at a point 25 at which the working medium flowing over the heat-exchanger tubes 6 is approximately at the same temperature and pressure as the make-up quantity.

The turbine 13 operated by the quantity of working medium circulated drives the compressors 1, 3 and 23, while the turbine 22, which is operated by the partial quantity extracted from the circuit, acts as useful output turbine and drives the ship's propeller 27 through a reduction gear 26. The turbine 13 and the compressors 1, 3 and 23 are further coupled to an electric motor 28, which serves as starting motor and as auxiliary motor for balancing surplus or lacking power.

The output of the plant is set higher or lower by raising or lowering the speed of the circuit turbine. The raising of the speed results in a higher sequence of pressures in the circuit, and in this way both the output of the circuit turbine and the useful output of the extraction turbine are increased. The lowering of the pressures in the circuit reduces the output of the two units. The combustion pressure in the gas heater is also changed proportionally with the rise or fall of the pressures in the circuit.

The plant is equipped with a regulating device adjusting the fuel quantity. In the fuel pipe 29 is arranged the regulating member 30 which is adjusted by the servomotor 31. The servomotor 31 is influenced by way of the impulse transmitting connection 32 by the temperature impulse transmitter 33 arranged in the pipe 12. Through this influencing of the fuel quantity the temperature of the working medium heated in the gas-heater 10 is kept at a constant level. When there is a change of load the fuel quantity can be rapidly adapted to the new load by means of the hand setting device 34 acting through the impulse transmitting connection 35, so that there is no retardation of regulation and no fluctuations of temperature.

The regulating device has a limiting arrangement which sets the range of adjustment of the fuel regulating member 30 in accordance with the load. The servomotor 31 is connected for this purpose to the pressure impulse transmitter 40 by way of the impulse transmitting connection 36. The pressure impulse transmitter is in its turn connected through the transmitting connection 41 to the combustion chamber 20 of the gas heater 10. The combustion pressure, which varies in accordance with the load, thus influences the limiting arrangement of the regulating device.

The temperature impulse transmitter 38 arranged in the transmitting connection 18 acts as a correcting device on the servomotor 31 through the impulse transmitting connection 39 and thus changes the relationship between the output of the plant and the range of adjustment set by the limiting arrangement in accordance with the temperature of the air used for combustion.

A specific regulating device for regulating the quantity of fuel delivered to a gas turbine plant constructed according to the principles illustrated in Fig. 1 is disclosed in detail in Fig. 2. A fuel regulating member 70 in a fuel supply pipe 71 is adjusted by means of a rod 45 in response to the temperature impulse transmitter 72 in such a way that the temperature of the heated gas is kept at a constant level. The temperature impulse transmitter 72 is located in the circuit turbine supply pipe 82 and operates the rod 45 by means of the servo-bellows arrangement 81. Attached to the valve 46 of the regulating member 70 is a rod 47 with a pin 48. This rod is connected through the spring 49 to the lever 50, which is linked at one end to the regulating rod 45 and is connected at the other end to the hand setting device 73.

The pin 48 engages with the cam surfaces 51 of the cam plate 52, which can be displaced in the directions of the double-headed arrow 66 by means of a rod 53 by the pressure impulse transmitter 74. The pressure impulse transmitter 74 is connected to the combustion chamber 75 of the gas heater 76 through the pipe 77. The servomotor piston 57 is pressed more or less against the spring 58 in accordance with the combustion pressure. The movement of the servomotor piston 57 is transmitted by means of the lever 59 to the rod 53 and the cam plate 52.

The point of attachment 60 of the lever 59 can be displaced by the temperature impulse transmitter 78 in the air supply pipe 79 through the lever 61, the rod 62, the bell crank 63 and the link 64.

The position of the regulating device shown in Fig. 2 corresponds to a medium load at which a medium pressure prevails in the combustion chamber 75 and sets the temperature impulse transmitter so that the required normal temperature is maintained. Correspondingly, the cam plate 52 with the cam surfaces 48 is in a middle position.

If the temperature of the heated gas rises above the normal value, the temperature impulse transmitter displaces the rod 45 in the plus direction of the double-headed arrow 65 and the valve 46 in the minus direction of the double-headed arrow 67. The fuel quantity is decreased, and the rise of temperature which started the regulation process is neutralised. A process of regulation in the opposite direction takes place when the temperature falls below the normal value, and then a larger quantiy of fuel is supplied to the burner 80.

With the aid of the lever 73 the fuel quantity set can be changed by hand. A movement of the lever in the plus direction of the double-headed arrow 68 causes an increase, a movement in the minus direction a decrease in the fuel quantity.

The range of adjustment of the valve 46 is set by the cam surfaces 51 in the cam plate 52, which acts as a limiting arrangement, in accordance with the pressure in the combustion chamber 75 and thus in accordance with the useful output of the whole plant. If a considerable deviation is transmitted from the temperature impulse transmitter through the rod 45, the pin 48 comes into contact either with the upper or the lower limiting curve of the cam surfaces 51, and a further adjustment of the valve 46 in the regulating member 70 can then no longer take place. The further displacement of the rod 45 only stresses the spring 49 in one direction or the other. The limiting arrangement prevents over-regulation and the oscillation of the regulating process which it would cause. It is of importance that for small fuel quantities the limiting points lie closer together than for large fuel quantities.

The limiting values for the adjustment of the regulating member 70 kept to by means of the cam plate 52 can be changed by the temperature of the air employed for combustion. If the temperature of the combustion air in the supply pipe 79 of the burner 80 rises, a larger amount of heat is supplied to the gas heater through the combustion air. Only a smaller amount of heat is then required to be supplied by the fuel. The lever 61 is then displaced in the plus direction of the double-headed arrow 55 and the cam plate 52 in the minus direction of the double-headed arrow 66. The limiting values for the setting of the fuel quantity are consequently reduced in accordance.

If the temperature of the combustion air falls, the lever 61 is displaced in the minus direction of the double-headed arrow 55. The cam plate 52 then moves in the plus-direction of the double-headed arrow 66. The limitation of the adjustment of the regulating valve 46 is then so changed that a correspondingly greater quantity of fuel can be supplied. The decreased heat supply through the combustion air is balanced by the increased heat supply through the fuel.

I claim:

1. A gas turbine plant comprising a compressor for compressing gaseous working medium, a heater for heating the compressed working medium, a turbine for expanding said heated working medium, a cooler for cooling the expanded working medium, conduit means for conducting said working medium around in circuit from the compressor to the heater, to the turbine, to the cooler and back to the compressor, means for withdrawing part of the working medium from the circuit, a second turbine driven by said withdrawn working medium, a second compressor for delivering make-up working medium to the circuit in replacement for the withdrawn working medium, a regulating device for adjusting the quantity of fuel delivered to the heater, a means responsive to the temperature of the heated working medium and influencing the regulating device, a means for limiting the adjustment of the regulating device, and a means responsive to the pressure of the working medium in the circuit and influencing the limiting device.

2. A gas turbine plant comprising a compressor for compressing gaseous working medium, a heater for heating the compressed working medium, a turbine for expanding said heated working medium, a cooler for cooling the expanded working medium, conduit means for conducting said working medium around in a circuit from the compressor to the heater, to the turbine, to the cooler and back to the compressor, means for withdrawing part of the working medium from the circuit, a second turbine driven by said withdrawn working medium, a second compressor for delivering make-up working medium to the circuit in replacement for the withdrawn working medium, a regulating device for adjusting the quantity of fuel delivered to the heater, a means responsive to the temperature of the heated working medium and influencing the regulating device, a means for limiting the adjustment of the regulating device, and a means responsive to the pressure in the combustion chamber of the gas heater and influencing the limiting device.

3. A gas turbine plant comprising a compressor for compressing gaseous working medium, a heater for heating the compressed working medium, a turbine for expanding said heated working medium, a cooler for cooling the expanded working medium, conduit means for conducting said working medium around in a circuit from the compressor to the heater, to the turbine, to the cooler and back to the compressor, means for withdrawing part of the working medium from the circuit, a second turbine driven by said withdrawn working medium, a second compressor for delivering make-up working medium to the circuit in replacement for the withdrawn working medium, a regulating device for adjusting the quantity of fuel delivered to the heater, a means responsive to the temperature of the heated working medium and influencing the regulating device, a means for limiting the adjustment of the regulating device, a means responsive to the pressure of the working medium in the circuit and influencing the limiting device, and a correcting device by means of which the relationship between the output of the plant and the regulating range can be altered.

4. A gas turbine plant comprising a compressor for compressing gaseous working medium, a heater for heating the compressed working medium, a turbine for expanding said heated working medium, a cooler for cooling the expanded working medium, conduit means for conducting said working medium around in a circuit from the compressor to the heater, to the turbine, to the cooler and back to the compressor, means for withdrawing part of the working medium from the circuit, a second turbine driven by said withdrawn working medium, a second compressor for delivering make-up working medium to the circuit in replacement for the withdrawn working medium, a regulating device for adjusting the quantity of fuel delivered to the heater, a means responsive to the temperature of the heated working medium and influencing the regulating device, a means for limiting the adjustment of the regulating device, a means responsive to the pressure of the working medium in the circuit and influencing the limiting device, a correcting device by means of which the relationship between the output of the plant and the regulating range can be altered, and a temperature measuring device responsive to the air used for combustion in the gas heater and automatically influencing the correcting device.

5. In a gas turbine plant of the semi-circuit type including a combustion chamber, a fuel supply line leading thereto and a device for regulating the quantity of fuel supplied, the improvement which includes a limiting device for controlling the permissible range of regulation of the fuel regulating device and means for influencing said limiting device in accordance with the combustion chamber pressure so that the mean value of the quantity of fuel which can be delivered over the permitted regulating range is greater at high combustion chamber pressures than at low combustion chamber pressures.

6. The improvement according to claim 5 in which the limiting device includes a correcting device by which the relationship between the combustion chamber pressure and the range of adjustment of the fuel regulating device can be changed automatically in accordance with the temperature of the air employed for combustion.

RENÉ STRUB.

REFERENCES CITED

The following references are of record in the file of this patent:

UNITED STATES PATENTS

| Number | Name | Date |
| --- | --- | --- |
| 1,802,848 | Summers | Apr. 28, 1931 |
| 2,200,892 | Pateras Pescara | May 14, 1940 |
| 2,280,765 | Anxionnaz et al. | Apr. 21, 1942 |
| 2,341,490 | Traupel | Feb. 8, 1944 |
| 2,355,177 | Pateras Pescara | Aug. 8, 1944 |
| 2,362,346 | Blake | Nov. 7, 1944 |
| 2,372,686 | Sedille | Apr. 3, 1945 |
| 2,374,510 | Traupel | Apr. 24, 1945 |
| 2,396,279 | Metsger | Mar. 12, 1946 |
| 2,399,152 | Traupel | Apr. 23, 1946 |

FOREIGN PATENTS

| Number | Country | Date |
| --- | --- | --- |
| 213,793 | Switzerland | June 3, 1941 |